(12) United States Patent
Becker et al.

(10) Patent No.: US 7,434,884 B2
(45) Date of Patent: Oct. 14, 2008

(54) FORWARDLY MOVABLE VEHICLE SEAT WITH AN UNDERFRAME AND TWO PAIRS OF RAILS

(75) Inventors: Burkhard Becker, Solingen (DE); Reinhard Vogel, Erkrath (DE)

(73) Assignee: C. Rob Hammerstein GmbH & Co. KG (DE)

( * ) Notice: Subject to any disclaimer, the term of this patent is extended or adjusted under 35 U.S.C. 154(b) by 422 days.

(21) Appl. No.: 11/316,715

(22) Filed: Dec. 22, 2005

(65) Prior Publication Data
US 2006/0138843 A1 Jun. 29, 2006

(30) Foreign Application Priority Data
Dec. 23, 2004 (DE) .................. 10 2004 063 412
Jun. 10, 2005 (DE) .................. 10 2005 026 861

(51) Int. Cl.
*A47C 1/02* (2006.01)
(52) U.S. Cl. ............... 297/341; 297/344.1; 248/429; 248/430
(58) Field of Classification Search .............. 297/341, 297/344.1; 248/429, 430
See application file for complete search history.

(56) References Cited
U.S. PATENT DOCUMENTS

| | | | |
|---|---|---|---|
| 4,569,557 A * | 2/1986 | Goforth | 297/341 |
| 5,695,247 A * | 12/1997 | Premji | 297/341 |
| 5,893,610 A * | 4/1999 | Schuler et al. | 297/341 |
| 5,899,532 A * | 5/1999 | Paisley et al. | 297/341 |
| 6,170,790 B1 * | 1/2001 | Schuler et al. | 248/430 |
| 6,234,575 B1 * | 5/2001 | Schuler et al. | 297/344.1 |
| 6,336,679 B1 * | 1/2002 | Smuk | 297/378.12 |
| 6,857,702 B2 * | 2/2005 | Becker et al. | 297/341 |
| 7,017,993 B2 * | 3/2006 | Niimi et al. | 297/341 |
| 7,090,188 B2 * | 8/2006 | Severini et al. | 248/424 |

* cited by examiner

*Primary Examiner*—Laurie K Cranmer
(74) *Attorney, Agent, or Firm*—Cantor Colburn LLP

(57) ABSTRACT

The forwardly movable vehicle seat has an underframe including a longitudinal adjusting device that has two pairs of rails, two catch devices and one actuation lever for actuating the catch devices. The vehicle seat further has a seat pan that is carried by the underframe. The seat pan includes a seat back that is pivotal about a seat back axis and on which there is disposed a release lever. In the actuation state, the seat back is unlocked for tilting, the actuation lever being actuated and the catch device unlocked when the seat back is tilted forward so that the seat can be brought from an initial position to a forwardly moved position. There is provided a memory mechanism that ensures that the seat, when being moved back from its forwardly moved position, resumes its initial position.

11 Claims, 5 Drawing Sheets

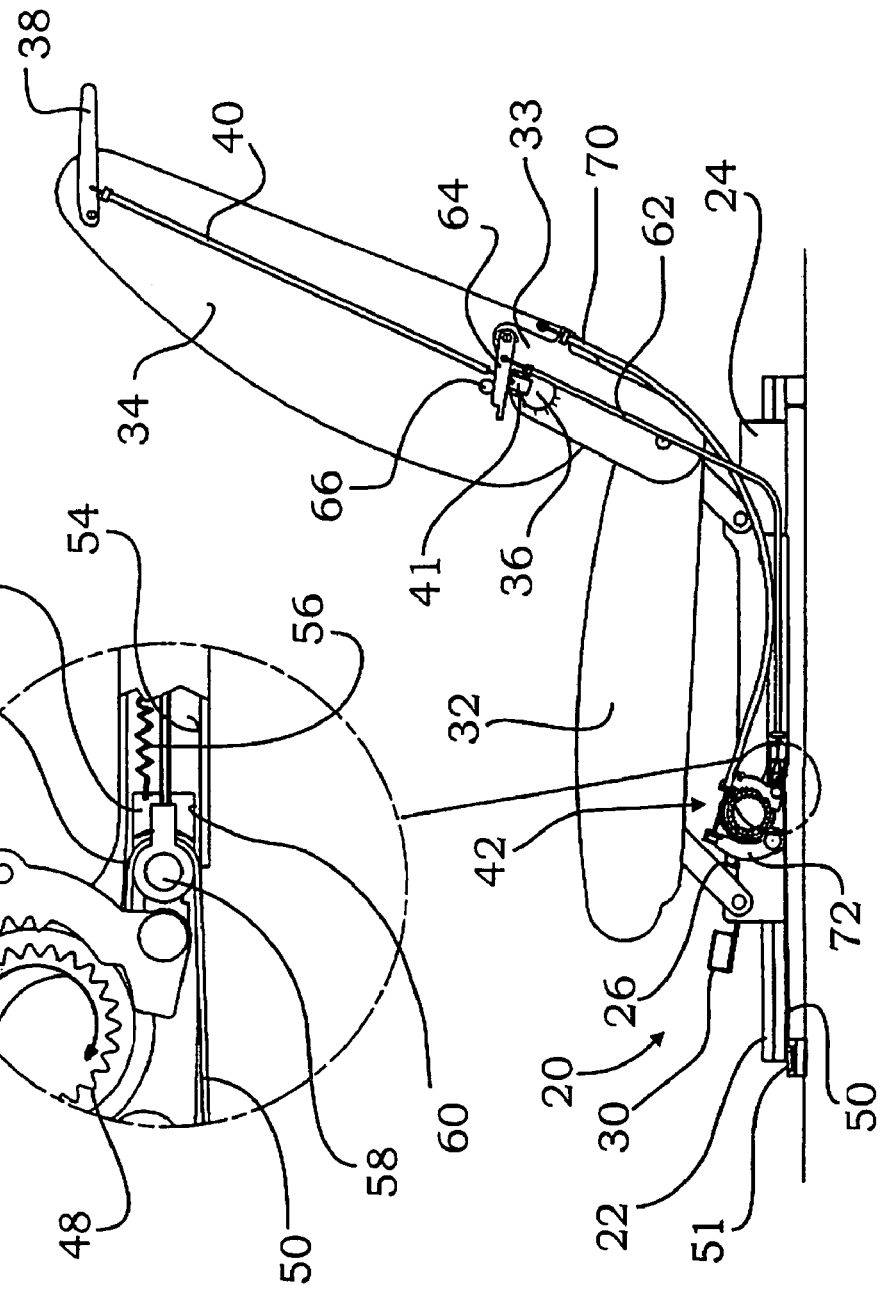
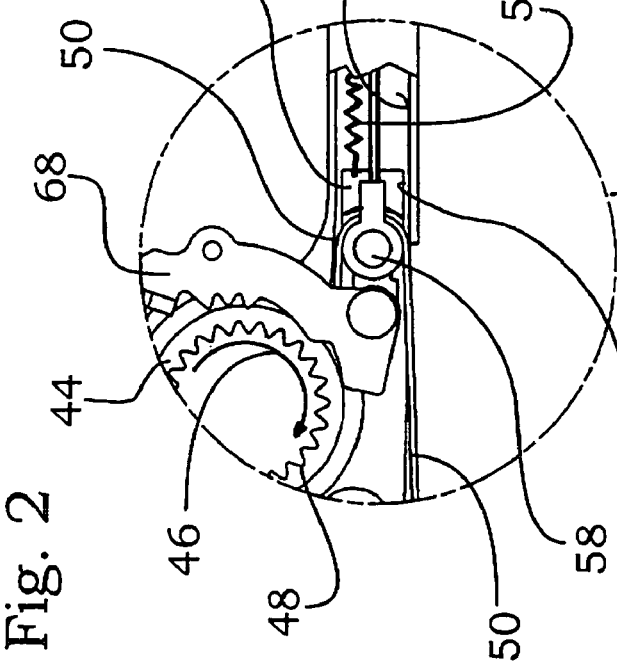

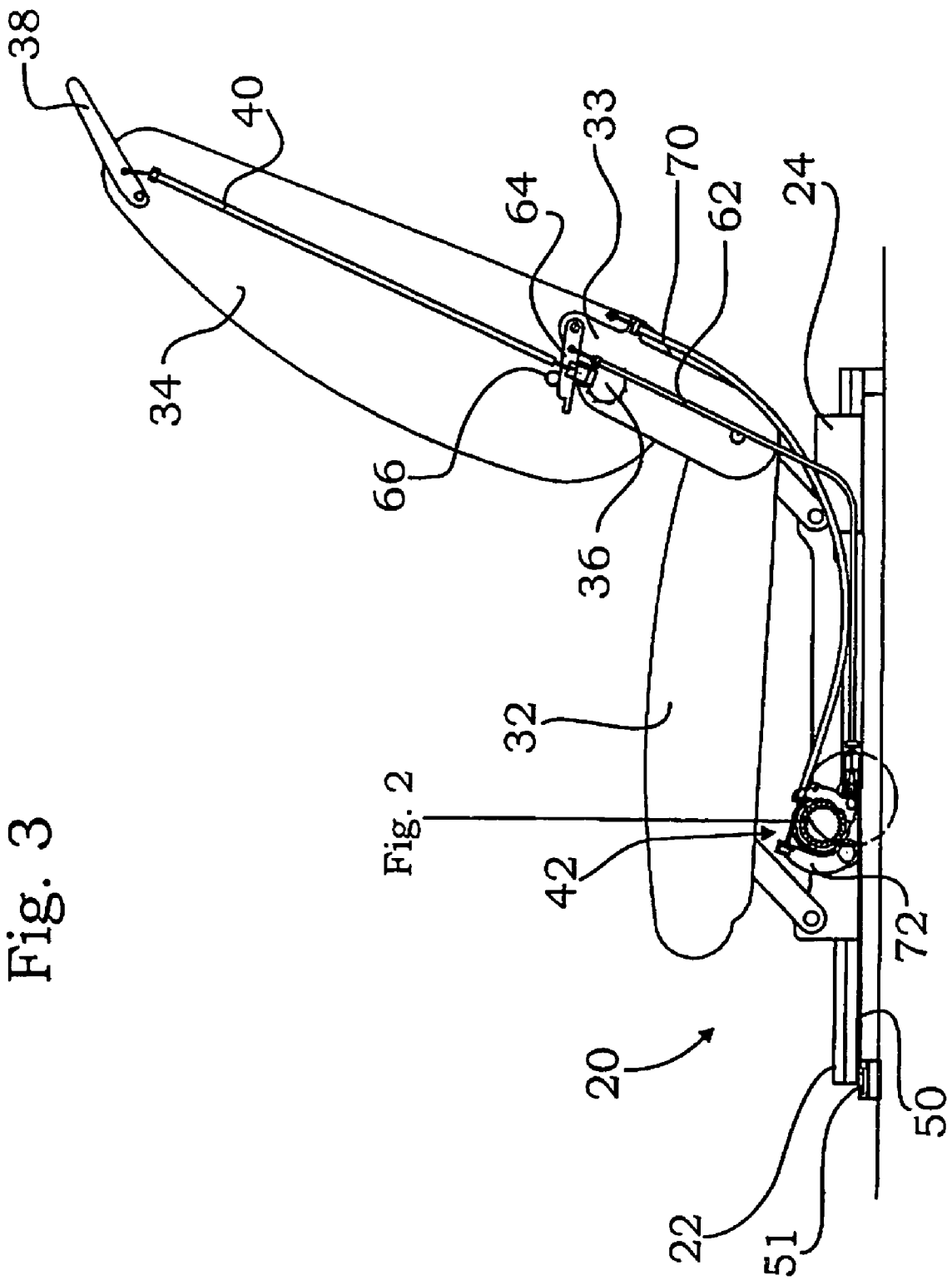

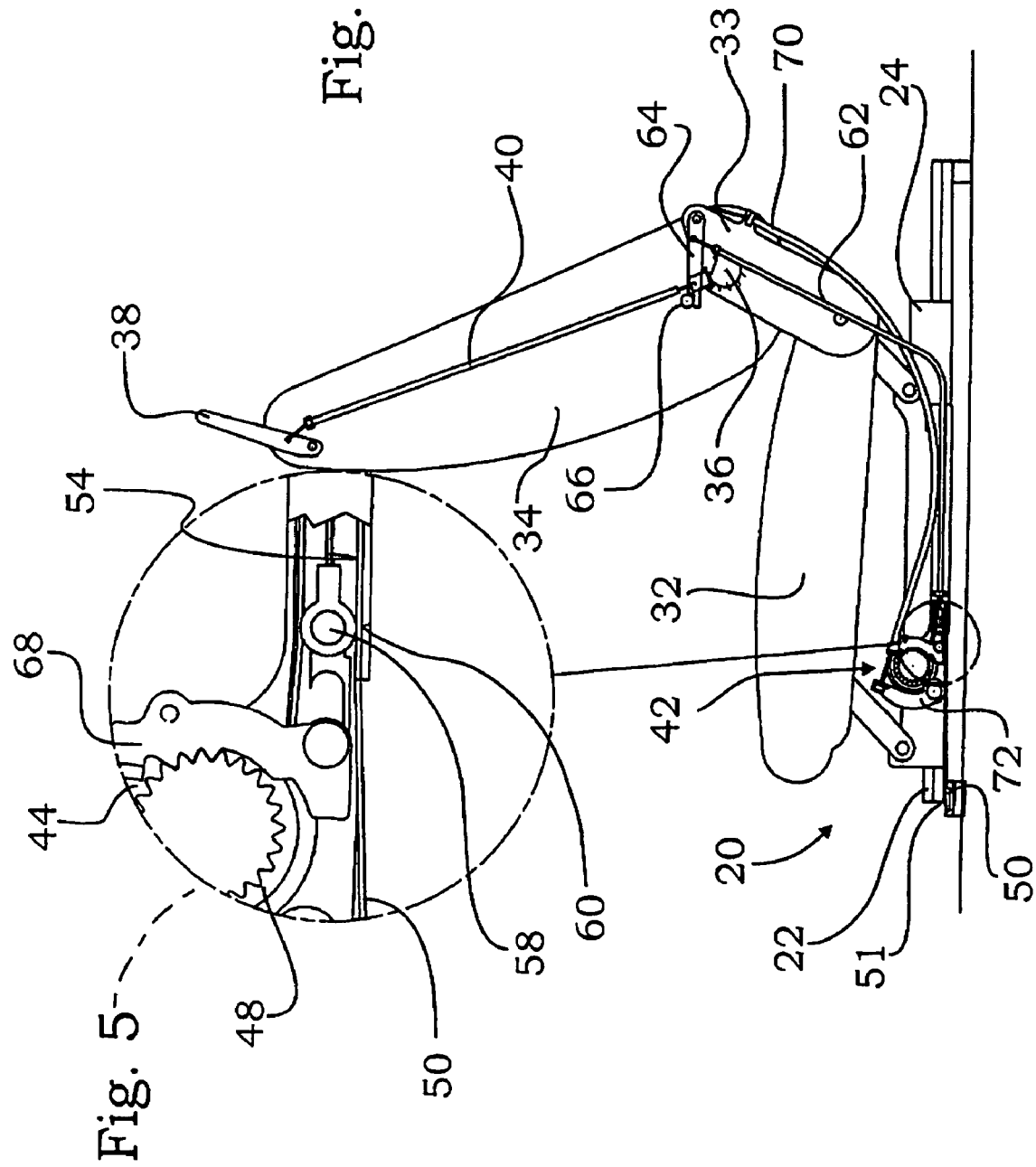

FORWARDLY MOVABLE VEHICLE SEAT WITH AN UNDERFRAME AND TWO PAIRS OF RAILS

TECHNICAL FIELD OF THE INVENTION

The invention relates to a forwardly movable vehicle seat
with an underframe comprising a longitudinal adjusting
device comprising two pairs of rails, two catch devices
and one actuation lever for actuating the catch devices,
with a seat pan carried by the underframe,
with a seat back that is hinged to the underframe so as to
pivot about a seat back axis and on which there is disposed a disengagement lever for unlocking a stop device
of the seat back when in the actuated state so that the seat
back is pivotal from the normal position to a forwardly
tilted position, the catch devices being unlocked and the
seat free to be brought from an initial position to a
forwardly moved position when the seat back is in the
forwardly tilted position, and
with a memory mechanism that ensures that the seat, when
pushed back, cannot be pushed from the forwardly
moved position beyond the initial position and that comprises a lockable rotary drum (44), a flat spiral spring
associated with said rotary drum and pull means, said
pull means being fastened at a first end in the front region
of a floor rail of a pair of rails and at a second end to the
rotary drum, said rotary drum being assigned to the
associated seat rail and said rotary drum being rotatable
about an axis extending transversely to the longitudinal
direction of the pairs of rails.

BRIEF DESCRIPTION OF THE RELATED ART

Forwardly movable vehicle seats of this kind are mainly in use in two door vehicles. They facilitate access to a back seat while boarding the vehicle through the only side door. When the vehicle seat is moved forward, access to the back seat located behind is facilitated.

Such type forwardly movable vehicle seats have to meet the requirement of being readily forward movable in mechanical terms. This forward movement is initiated by actuating the disengagement lever which releases the normally locked seat back hinge. As a result of the then enabled forward tilt of the seat back, the two catch devices are released so that the seat may be moved forward within the pairs of rails of the longitudinal adjusting device. If the seat is moved back thereafter, the initial position has to be found again. This is achieved by means of the memory mechanism. Said memory mechanism ensures that the seat is only allowed to move back as far as the initial position.

A forwardly movable vehicle seat of the type mentioned herein above is known from EP 0 844 133 B1. Similar forwardly movable vehicle seats are also known from U.S. Pat. No. 5,893,610, DE 197 57 111 C1 and DE 197 57 110 C1. On these forwardly movable vehicle seats, the rotary drum takes up excess length created by the forward movement of the seat. The rotary drum is not connected to the detent rim and continues to rotate with respect to the detent rim during forward movement of the seat. A complicated device allowing the rotary drum to continue rotating and to take up the excess length during forward movement of the seat is disposed between rotary drum and detent rim. This device only allows taking up the excess length; it has a limit stop the rotary drum abuts when the seat is moved back, i.e. when it is in the initial position. This device is quite complicated.

Vehicle seats are known from U.S. Pat. No. 2,850,074 and EP 0 844 132 in which an elastic arrangement consisting of a rotary drum and a pull means is provided between the rails of the longitudinal adjusting device for elastically biasing the rails in a displacement direction.

BRIEF SUMMARY OF THE INVENTION

The invention improves the forwardly movable vehicle seat of the type mentioned herein above in such a manner that the excess length created by forward movement is taken up by a few, as far as practicable simple, mechanical means and may be used for controlling.

The advantage of this forwardly movable vehicle seat is that the pull means always remains in proximity to the associated pair of rails. No space is needed for the pull means to deflect transversely. The pull means is loaded in the very direction of the occurring forces. The pull means may initiate additional mechanical control operations, in particular the release of a peripheral cam that retains the seat back in the forwardly tilted position. All the components of the memory mechanism may be conveniently disposed in proximity to the associated pair of rails. This facilitates assembly and saves components.

In an advantageous improved implementation, there is provided a control slide that is guided in a control guide means connected to the seat rail and extending in the longitudinal direction. A peripheral cam is provided on the underframe and is movable between a passive normal position and an active position, the peripheral cam retaining the seat back in the forwardly tilted position when in the active position, and a controlling bowden cable is provided for connecting control slide and peripheral cam together.

The advantage of this embodiment is that the seat back remains and is held inclined during the entire forward movement and also during the major part of the backward movement. It is not allowed to adopt its normal position of utilization until the peripheral cam has been pulled free.

Advantageously, the stretching element is guided in a guide means that is connected to the seat rail and extends in the longitudinal direction, said guide means of the stretching element has a guide path which, in an end region, coincides with the guide means of the control slide, the stretching element comprises an abutment surface that comes into contact with the control slide, and, when the seat back is in the normal position, the stretching element and the control slide are contacting each other and are both in an end position.

Stretching elements and peripheral cam cooperate in such a manner that the stretching element abuts the control slide and carries it along with it shortly before the seat assumes the memorized position during backward movement thereof. The distance the control slide is capable of traveling is preferably clearly shorter than the distance traveled by the peripheral cam.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

FIG. 1: is a schematic side view of a forwardly movable vehicle seat in the normal position of utilization or normal position of the seat and with the various component parts of the invention, with the memory mechanism in particular, FIG. 2 is a partial view of FIG. 1, that is, the detail encircled by a dash-dotted line, FIG. 3 is the side view like FIG. 2, but now with the back seat being tilted forward, FIG. 4 is the side view like FIG. 3, but now with the seat moved forward in the longitudinal adjusting device, FIG. 5 is the partial illustration like FIG. 1 for the condition in accordance with FIG. 4.

DETAILED DESCRIPTION OF THE INVENTION

Figure 6:
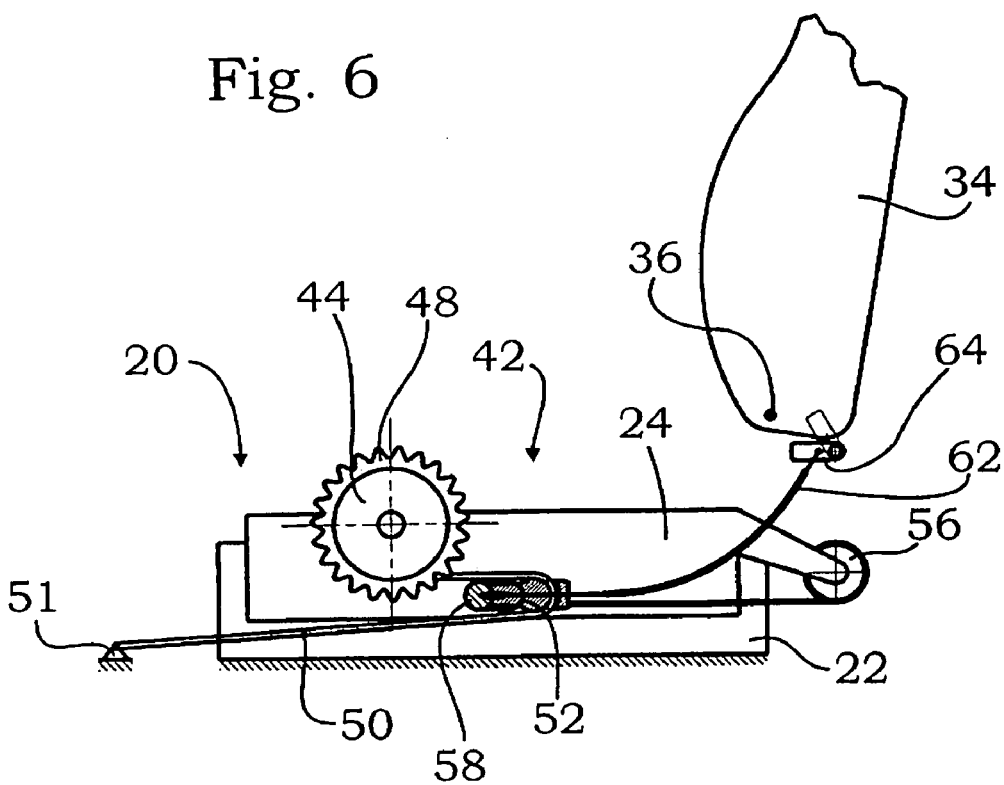
FIG. 6 is a schematic side view similar to FIG. 1 of another embodiment of the forwardly movable vehicle seat in the condition like in FIG. 1.

FIG. 1 schematically illustrates a vehicle seat in a side view. The vehicle seat has an underframe 20. Said underframe has a longitudinal adjusting device with a left and a right pair of rails, each comprising a floor rail 22 and a seat rail 24.

Only one pair of rails, the left one, is shown. The pairs of rails are displaceable with respect to each other in the longitudinal direction that is to say, from the left to the right and reverse in the plane of the drawing. This displacement occurs in the longitudinal adjusting direction. Normally, the rails 22, 24 are locked, a catch device 26 being associated with each pair of rails for this purpose. The two catch devices 26 of the seat sides are synchronized together. An actuating lever 30 permits to manually bring the catch devices 26 from the normal locking position into a release position.

The seat further has a seat pan 32 that is carried by the underframe 20 and has a part 33. The seat additionally has a seat back 34 that is pivotal about a seat back axis 36. A disengagement lever 38 is disposed on the seat back 34, in the upper region thereof. By actuating said lever, the seat back is unlocked for tilting, as may be seen from FIG. 4. The disengagement lever 38 is connected to a first bowden cable 40, said bowden cable terminating at its bottom end in a slide 41 that cooperates with a mating part fastened to part 33. Slide 41 and mating part form together a stop device of the seat back 34.

In the forwardly tilted position of the seat back 34, the actuation lever 30 is actuated through the first bowden cable 40. By doing so, the catch devices 26 are unlocked. In addition thereto, a memory mechanism 42 is also set. Said memory mechanism is not set upon actuation of the catch devices 26 by means of the actuation lever 30.

The memory mechanism 42 ensures that the seat returns from the forwardly moved position (FIG. 4) to the initial position (FIG. 1). The memory mechanism 42 has a rotary drum 44 that is rotationally biased by a suited torsion spring in one direction of rotation (arrow 46). It further has a detent rim 48 that is coaxial with the rotary drum 44. It is solidly connected to the rotary drum 44, preferably so as to be integral with it. A pull means 50 which, in the first exemplary embodiment in accordance with the FIGS. 1 through 5 is configured to be a flexible cable, e.g., a steel cable, and in the second exemplary embodiment in accordance with the FIGS. 6 through 8 a flexible belt, winds on the rotary or winding drum 44. Kevlar cables or other cables exhibiting high tensile strength are preferred. The pull means 50 is fastened at a front first end region 51 to the front end region of the associated floor rail 22; in the second embodiment (FIGS. 6 through 8) it is fastened to the underbody in front of the floor rail 22. Its other end is retained in the rotary drum 44.

The pull means 50 extends substantially in the longitudinal direction of the two pairs of rails 22, 24. It has two portions, namely an upper portion and a lower portion. It forms a U-shape around a stretching element 52 provided with a slot for this purpose. Said stretching element 52 is guided in a guide means 54 so as to be longitudinally displaceable. Said guide means 54 extends in the longitudinal direction of the rails, meaning in the direction of the longitudinal adjustment. An elastic stretching device or an elastic means 56 for pulling the stretching element 52 backward and, as a result thereof, away from the rotary drum 44 is associated with said stretching element 52. As a result, the pull means 50 is always subjected to a certain stress.

In the range of motion of the stretching element 53 there is located a control slide 58. Said control slide too is displaceable in the direction of longitudinal adjustment in a guide means called control slide guide means 60. The distance X guide means 60 allows is however quite short. The control slide 58 is connected through a second bowden cable 62 to a peripheral cam 64 which is located in proximity to the seat back axis 36 and is movably disposed on a part 33 that is connected to the seat pan 32. Said peripheral cam 64 cooperates with a limit stop 66 that is configured to be a pin and is provided on the seat back 34. In the positions illustrated in the FIGS. 1 and 3, the peripheral cam 64 is located underneath the limit stop 66 and has no engagement with the latter. In the representation in accordance with FIG. 4, the limit stop 66 is located in a control recess of the peripheral cam 64 and mechanically retains the seat back in the forwardly tilted position as shown in FIG. 4. The seat back is not allowed to leave this forwardly tilted position until the peripheral cam 64 has been pivoted away downward, this being achieved by the second bowden cable 62 and, as a result thereof, by a movement of the control slide 58 to the left (toward the front in the direction of travel).

In immediate proximity to the rotary drum 44, a stopper arm 68 is pivotally disposed on the seat rail 24. It has a toothed surface that cooperates with toothed surface 48. Normally, it is out of engagement with the toothed surface and accordingly biased. When in this state the seat is displaced in the longitudinal adjusting device, the rotary drum rotates and either releases some length of pull means 50 or rewinds said pull means 50, depending on the direction of the longitudinal adjustment. The stopper arm 68 is connected to the seat back 34 through a third bowden cable 70. Concretely, the sheath of this third bowden cable 70 abuts the stopper arm 68 at one of its ends and at its other end an abutment provided on part 33. At the top, the core of this third bowden cable 70 is connected with the seat back 34. When the seat back is pivoted forward from the normal position shown in FIG. 1, the core of the third bowden cable 70 is tensioned. At the bottom, the core is fastened to an arm 72 that actuates the catch devices 26. Accordingly, pivoting the seat back 34 forward causes the rotary drum 44 to be locked on the one side and the stopped longitudinal adjusting device to be released on the other.

Figure 8:
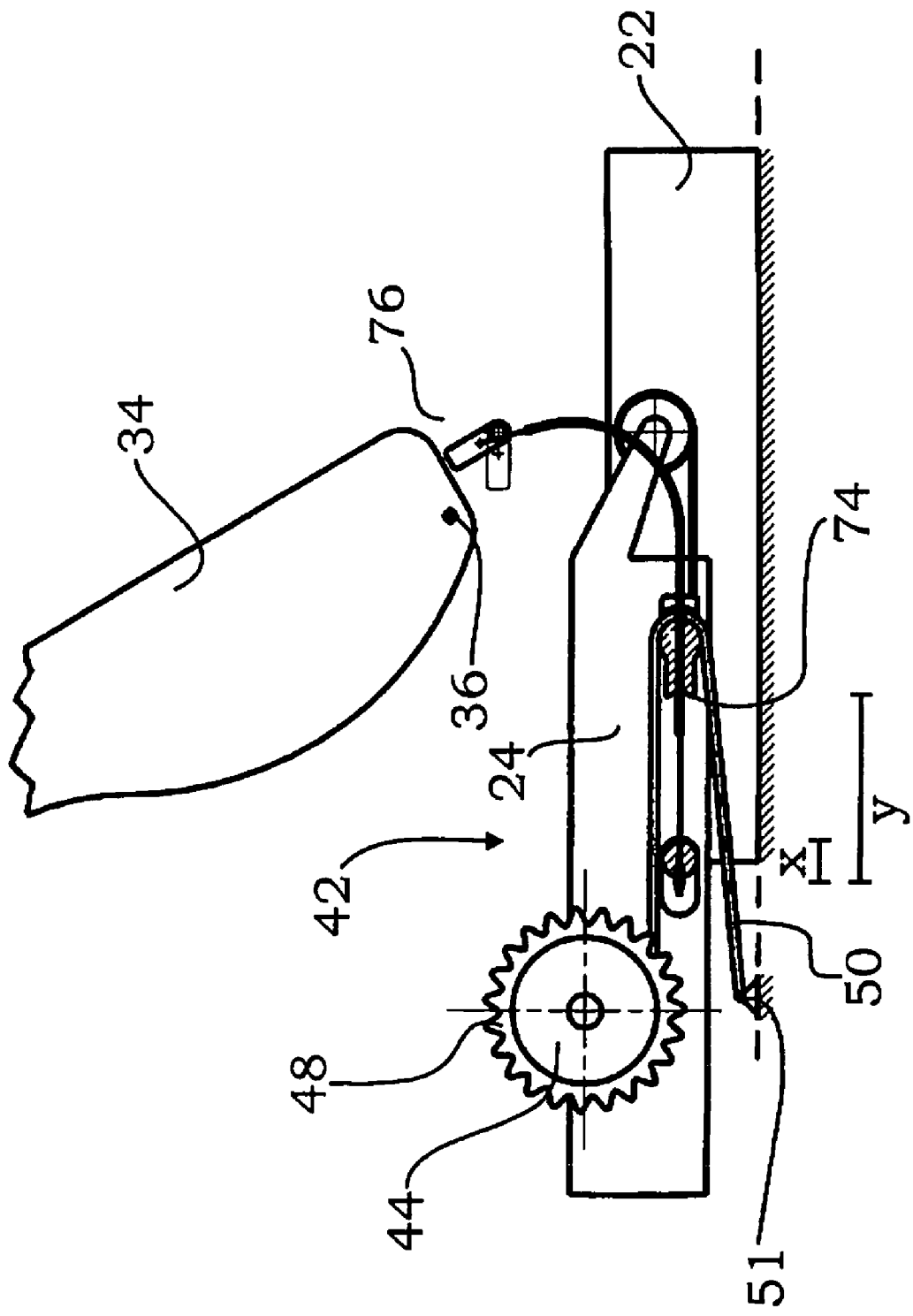

As shown in FIG. 1, the first end 51 of the pull means 50 is located in front of the rotary drum 44 when viewed in the direction of travel. When the seat is moved forward, the rotary drum 44 gets in proximity to the fist end 51, as seen by comparing the FIGS. 1 and 4. As shown in FIG. 8 for example, the stretching element 52 has an abutment surface 74 that cooperates with a neighboring portion of the control slide 58. In the normal position, said abutment surface 74 fits against the control slide, see FIG. 1.

In practical use, the following motion sequence is performed: Commencing with FIG. 1, which shows the normal position and, as a result thereof, the normal utilization position, the release lever 38 is actuated in order to allow the seat back 34 to be tilted forward about the seat back axis 36 at all, meaning to reach the position shown in FIG. 4. The first bowden cable 40 is actuated through the release lever 38, thus allowing the slide to come free from a recess in the mating part. This condition is shown in FIG. 3. In this condition, the seat back 34 is free to be tilted forward. In FIG. 4, it has been tilted forward to a position in which the peripheral cam 64 fits against the limit stop 66 so that the seat back 34 is locked and prevented from tilting back.

As the seat back 34 starts tilting forward, the third bowden cable 70 is actuated, so that on the one side the catch devices 26 are pulled free, meaning the longitudinal adjusting device unlocked, and on the other side the rotary drum 44 locked. Locking the rotary drum 44 results in the length of the pull means 50 being fixed, so that the initial position as it can be seen in the FIGS. 1 and 3 can be resumed when the seat is moved backward after forward movement thereof. The seat is not allowed to be displaced backward beyond the position corresponding to the locked length of the pull means 50.

As the seat is being moved forward from the position shown in FIG. 3 to the position shown in FIG. 4, the rotary drum 44 gets in proximity to the first end 51 of the pull means 50. This creates excess length of the pull means. The stretching element 52 pulls the pull means away backward (when viewed in the direction of travel) as can be seen from FIG. 5 in which FIG. 5 however the stretching element 52 is no longer shown. As a result, the control slide 58 is also allowed to move backward, this movement being assisted by an elastic means. The peripheral cam 64 is for example rotationally biased by a spring in a clockwise direction. Movement of the control slide 58 inside its guide means 60 allows the peripheral cam 64 to pivot slightly upward (in a clockwise direction).

When the seat is now moved back from the position shown in FIG. 4, that is, when it is to be brought back to the normal position shown in FIG. 1, a force must be applied to the seat back 34 for pulling the seat backward in the longitudinal guide. Since the seat back 34 is locked by the stopper cam 64, it remains in the forwardly tilted position notwithstanding a force applied and acting thereon, at least until the seat has almost reached the initial position, as shown in FIG. 1. The stretching element 52 will only have come sufficiently to the front within its guide means to be capable of abutting the control slide 58 shortly before the seat reaches this normal or initial position. This will not happen but in the last millimeters of the displacement path. When the control slide 58 is displaced to the front by the stretching element 52, the peripheral cam 64 is pivoted downward (counter clockwise) so that it comes free from the limit stop 66. This means that the seat back 34 may now be tilted back to its upright position.

Figure 7:
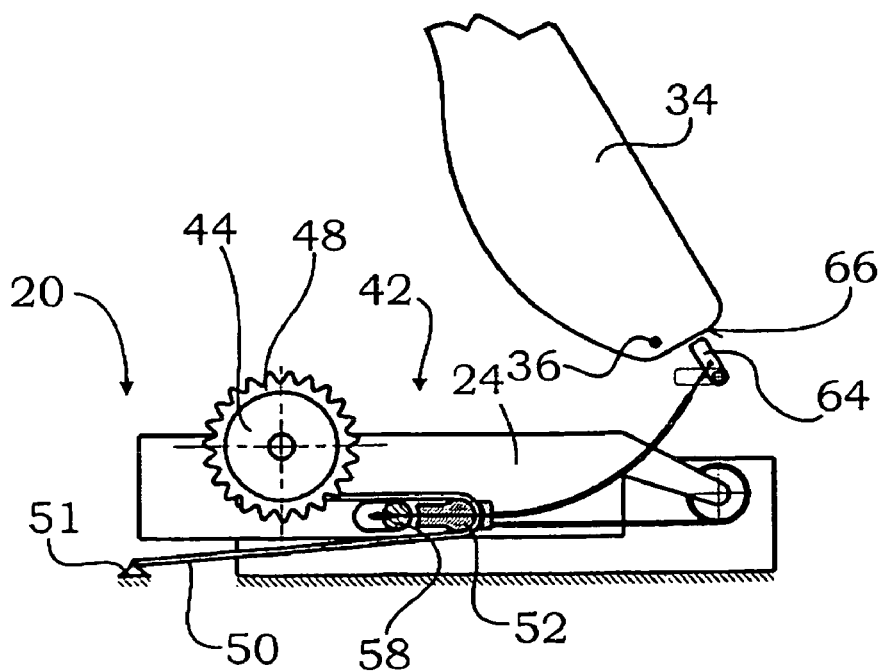
FIG. 7 is the side view like in FIG. 6 but now with forward tilted seat back and forwardly moved seat and FIG. 8 is the side view like in FIG. 7 but during backward movement of the seat shortly before it reaches the condition shown in FIG. 1.

The motion sequence as it has been described herein is also depicted in the FIGS. 6 through 8. This second exemplary embodiment has many similarities with the first exemplary embodiment; these similarities will substantially not be discussed. Instead, the differences will be entered into. As contrasted with the first exemplary embodiment, the first end of the stretching element 52 is now fastened to an underbody in front of the floor rail 22. It is also possible to fasten this first end in proximity to the front end of the floor rail.

Now, the peripheral cam 64 cooperates directly with the seat back 34, meaning the seat back 34 forms the limit stop 66. The peripheral cam 64 is again a single-arm lever to which the second bowden cable 62 applies. In the second exemplary embodiment, the elastic means 56 no longer is a helical spring but a flat spiral spring instead. It is disposed on the seat rail 24. Alternatively, it may also be provided on the floor rail 22. It appears that the distance X the control slide 58 is capable of traveling inside its control slide guide means 60 is clearly smaller than the distance Y the stretching element 52 is capable of traveling in its guide means 54. This can be seen from FIG. 8 and also by comparing the FIGS. 7 and 8.

The invention claimed is:

1. A forwardly movable vehicle seat
   with an underframe comprising a longitudinal adjusting device comprising two pairs of rails, two catch devices and one actuation lever for actuating the catch devices,
   with a seat pan carried by said underframe,
   with a seat back that is hinged to said underframe and pivots around a seat back axis, a disengagement lever being disposed at the seat back for unlocking a normally locked stop device of said seat back if said disengagement lever is brought in an actuated state in which actuated state said seat back is pivotal from the normal position to a forwardly tilted position and, once said seat back is in the forwardly tilted position, said catch devices are unlocked and the seat is free to be moved from an initial position to a forwardly moved position, and
   with a memory mechanism being attached to the seat and providing a stop at the initial position and the seat, when being pushed back, cannot be pushed back from the forwardly moved position beyond the initial position, which memory mechanism comprises a lockable rotary drum, a flat spiral spring associated with said rotary drum and pull means, said pull means being fastened at a first end in a front region of a floor rail of a pair of rails and at a second end to said rotary drum, said rotary drum being assigned to a seat rail associated to said floor rail, and said rotary drum being rotatable about an axis extending transversely to the longitudinal direction of said pair of rails,
   wherein the pull means substantially extends in the longitudinal direction of said pair of rails, that a stretching element is provided around which the pull means is laid in a U-shape and that an elastic stretching device is provided for pulling the stretching element away from the rotary drum and the pull means remains tense even if the seat is being moved forward.

2. The forwardly movable vehicle seat as set forth in claim 1, wherein there is provided a control slide that is guided in a control guide means and extending in the longitudinal direction, and wherein there is provided on the underframe a peripheral cam that is movable between a normal passive position and an active position, said peripheral cam retaining the seat back in the forwardly tilted position when in the active position, and wherein there is provided a controlling bowden cable that connects said control slide and said peripheral cam together.

3. The forwardly movable vehicle seat as set forth in claim 2, wherein the control guide means is connected to the seat rail.

4. The forwardly movable vehicle seat as set forth in claim 1, wherein the stretching element is guided in a guide means that is connected to the seat rail, said guide means of the stretching element has a guide path Y which, in an end region, coincides with the control slide guide means, said stretching element comprises an abutment surface that comes into contact with the control slide and wherein, when the seat back is in the normal position, said stretching element and said control slide contact each other and are both in an end position.

5. The forwardly movable vehicle seat as set forth in claim 1, wherein, when the seat is moved forward from the initial position to the forwardly moved position, the stretching element is displaced from an initial position to an end position and the stretching element contacts the control slide on only a short portion X of the entire distance it travels on path Y from the initial position to the end position, and said portion commences at the initial position.

6. The forwardly movable vehicle seat as set forth in claim 5, wherein the portion X is less than 5% of the entire path Y.

7. The forwardly movable vehicle seat as set forth in claim 5, wherein the portion X is less than 10% of the entire path Y.

8. The forwardly movable vehicle seat as set forth in claim 1, wherein an elastic means is provided which biases the peripheral cam in the active position.

9. The forwardly movable vehicle seat as set forth in claim 1, wherein there is provided a stopper arm that is located in proximity to the rotary drum and is movable between a normal release position and a locking position, said stopper arm blocking rotation of the rotary drum in the locking position and wherein there is provided a third bowden cable that is attached to said stopper arm.

10. The forwardly movable vehicle seat as set forth in claim 1, wherein, when the seat is being displaced forward into the forwardly moved position, the distance between the rotary drum and the first end of the pull means becomes smaller.

11. The forwardly movable vehicle seat as set forth in claim 1, wherein in the forwardly moved position of the seat the rotary drum is located behind the first end of the pull means.

* * * * *